US008125450B2

(12) United States Patent
Itoh et al.

(10) Patent No.: US 8,125,450 B2
(45) Date of Patent: Feb. 28, 2012

(54) OPERATING DEVICE FOR VEHICLE

(75) Inventors: Masahiro Itoh, Ichinomiya (JP); Takeshi Haruyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 553 days.

(21) Appl. No.: 12/382,011

(22) Filed: Mar. 5, 2009

(65) Prior Publication Data

US 2009/0225027 A1 Sep. 10, 2009

(30) Foreign Application Priority Data

Mar. 7, 2008 (JP) .................................. 2008-58029

(51) Int. Cl.
*G06F 3/033* (2006.01)
*G09G 5/08* (2006.01)

(52) U.S. Cl. ......................... 345/161; 345/156; 200/5 R

(58) Field of Classification Search .......... 345/156–158, 345/161; 200/5 A, 5 R, 17 R, 345; 715/784, 715/828, 863

See application file for complete search history.

(56) References Cited

U.S. PATENT DOCUMENTS

| | | | | |
|---|---|---|---|---|
| 6,178,841 | B1 * | 1/2001 | Ruckert et al. | 74/471 XY |
| 6,366,442 | B1 | 4/2002 | Onodera | |
| 6,859,198 | B2 * | 2/2005 | Onodera et al. | 345/161 |
| 6,952,197 | B1 | 10/2005 | Nakamura et al. | |
| 7,476,818 | B2 * | 1/2009 | Nam | 200/5 R |
| 7,965,282 | B2 * | 6/2011 | Yamada | 345/184 |
| 2001/0004044 | A1 * | 6/2001 | Sotome et al. | 200/5 R |
| 2002/0080116 | A1 * | 6/2002 | Onodera et al. | 345/161 |
| 2007/0115604 | A1 * | 5/2007 | Zettel et al. | 361/160 |
| 2009/0066474 | A1 * | 3/2009 | Kawachi et al. | 340/3.1 |

FOREIGN PATENT DOCUMENTS

| | | |
|---|---|---|
| JP | A-2000-315138 | 11/2000 |
| JP | A-2000-353023 | 12/2000 |
| JP | A-2001-028223 | 1/2001 |
| JP | A-2002-207553 | 7/2002 |
| JP | A-2002-331881 | 11/2002 |
| JP | A-2003-139628 | 5/2003 |
| JP | A-2005-004354 | 1/2005 |
| JP | A-2006-280498 | 10/2006 |
| JP | A-2007-087012 | 4/2007 |

OTHER PUBLICATIONS

Office Action dated Feb. 16, 2010 issued from the Japan Patent Office for corresponding Japanese patent application No. 2008-58029 (English translation enclosed).

Office Action mailed Feb. 16, 2010 from Japan Patent Office in corresponding JP Application No. 2008-058029 (and English translation).

Office Action mailed Aug. 4, 2010 from Chinese Patent Office in corresponding CN Application No. 200910126924.5 (and English translation).

* cited by examiner

*Primary Examiner* — Kimnhung Nguyen

(74) *Attorney, Agent, or Firm* — Posz Law Group, PLC

(57) ABSTRACT

An operation knob of an operating device for a vehicle is movably supported by an X-direction sliding unit and a Y-direction sliding unit. A push switch is interposed between the operation knob and the X-direction sliding unit, which is arranged above the Y-direction sliding unit. A ball bearing having a through-hole, through which an axial rod of a joystick device passes, is movably supported by the axial rod in an axial direction thereof. According to such a structure, the operation knob can be moved to a desired position, and the push switch can be surely operated to be turned-on or turned-off.

29 Claims, 10 Drawing Sheets

OPERATING DEVICE FOR VEHICLE

CROSS REFERENCE TO RELATED APPLICATION

This application is based on Japanese Patent Application No. 2008-58029, which is filed on Mar. 7, 2008, the disclosure of which is incorporated herein by reference.

FIELD OF THE INVENTION

The present invention relates to an operating device for a vehicle, which outputs a signal corresponding to a pushing force applied to an operating portion.

BACKGROUND OF THE INVENTION

A joystick device (a joystick type input device) is conventionally known in the art, for example as disclosed in Japanese Patent Publication No. 2002-207553, according to which a signal corresponding to an operating direction (an upward direction, a downward direction, a left-hand direction, a right-hand direction) and an operating amount of a joystick is outputted. In addition, a push detecting signal is outputted from the joystick device, when a pushing force is applied to the joystick in its axial direction.

According to the above joystick type input device, the joystick is operated in the respective directions (up-and-down direction, and left-and-right direction), and a forward end of the joystick is pushed by a thumb in the axial direction of the joystick, so that a decision of operation is done. According to such joystick device, however, it is required for an operator to correctly push the joystick in a direction of a supporting axis. Otherwise, the joystick may be inclined and a displacement may occur, resulting in a malfunction.

The above joystick type input device, in which the forward end of the joystick is pushed by the thumb, may be suitable for game machines. Such input device, however, is not adequate to be applied to an input device for a vehicle.

Since the input device for the vehicle is generally located at a center console of the vehicle, it is not adequate to push the forward end of the joystick by the thumb. Such an input device is desirable for the vehicle, which an operator may operate by his one hand not only to decide direction and but also to carry out a decision operation.

In the case that the input device is located at the center console of a vehicle, in particular of a right-handle vehicle, it is necessary for a vehicle driver to operate such input device with his left hand. And thereby, it is further undesirable in view of operationality, for the driver, to change the direction of the joystick and to push the forward end of the joystick.

SUMMARY OF THE INVENTION

The present invention is made in view of the above problems. It is an object of the present invention to provide an operating device for a vehicle having an improved operationality.

According to a feature of the invention, an operating device for a vehicle has an operating portion, a signal outputting portion for outputting a signal in accordance with pushing force from the operating portion, and a supporting portion for movably supporting the operation portion and the signal outputting portion, such that the operation portion and the signal outputting portion move along an operation surface. In such operating device, the operating portion moves in a direction perpendicular to the operation surface and transmits the pushing force to the signal outputting portion, when the operating portion receives the pushing force in the direction perpendicular to the operation surface.

According to such a structure, the signal outputting portion moves together with the operating portion along the operation surface. The operating portion moves in the direction perpendicular to the operation surface and transmits pushing force to the signal outputting portion, when the operating portion receives the pushing force in the direction perpendicular to the operation surface. Accordingly, it is possible for a vehicle driver to put his one hand on the operating device to move the operating portion along the operation surface and applies the pushing force to the operating portion in the direction perpendicular to the operation surface, so that the signal outputting portion may output a signal corresponding to the pushing force. As a result, operationality is improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
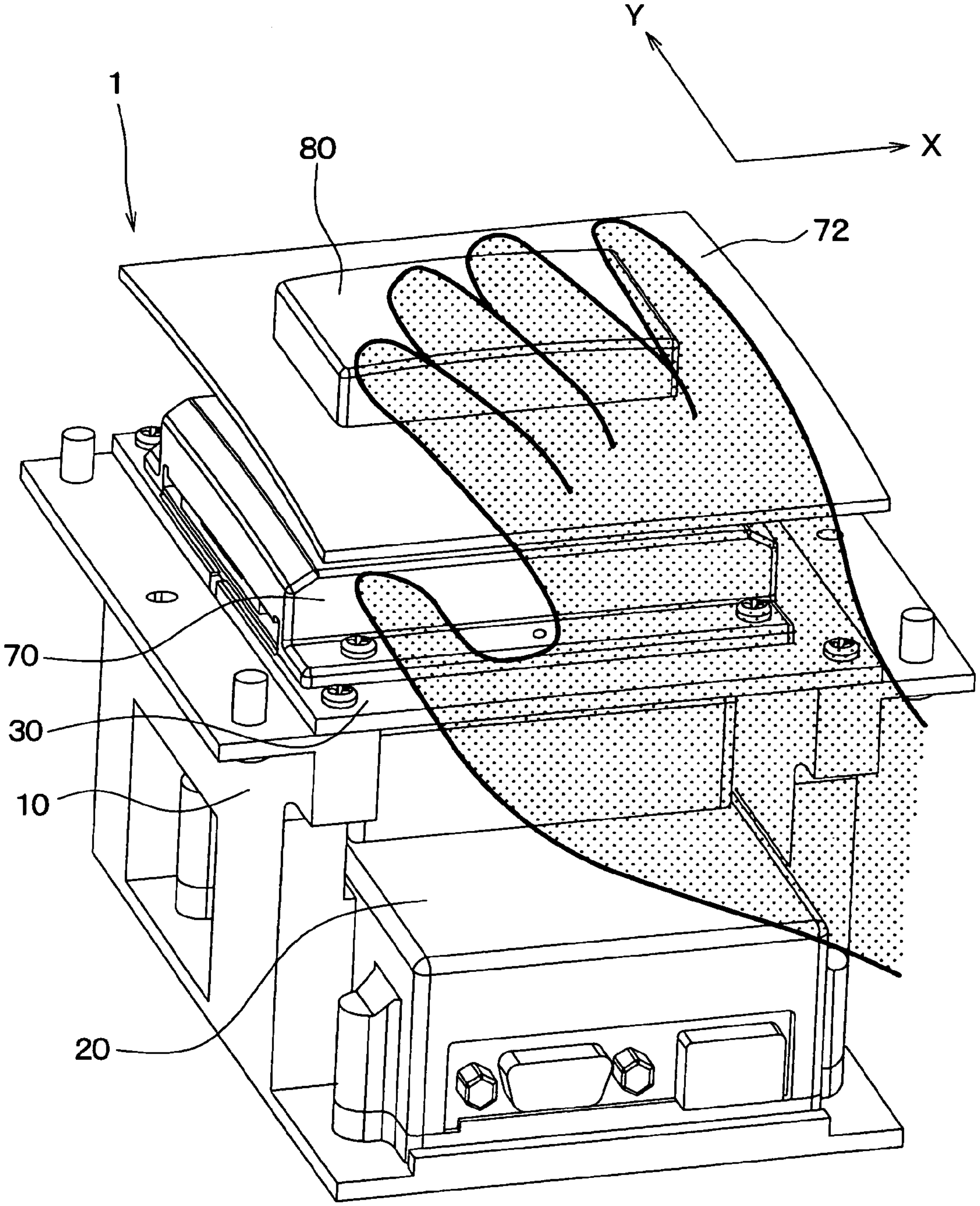
FIG. 1 is a schematic perspective view showing an operating device for a vehicle according to an embodiment of the present invention.

FIG. 1 is a schematic perspective view showing an operating device for a vehicle according to an embodiment of the present invention. As shown in FIG. 1, the operating device 1 for the vehicle has a lower casing 10 for accommodating a joystick device 20, a base member 30 fixed to the lower casing 10, an upper casing 70 fixed to the base member 30, a bezel 72 fixed to the base member 30 together with the upper casing 70, and an operation knob 80 arranged at an upper surface of the bezel 72.

The bezel 72 is fixed to the base member 30, but the operation knob 80 is movable not only in a horizontal direction (in an X direction in the drawing) but also in a cross section (in a Y direction in the drawing), wherein an upper surface of the bezel 72 is serving as an operation surface, so that the operation knob 80 is moved downwardly, i.e. in a direction perpendicular to the operation surface, depending on an operation of an operator.

Figure 2:
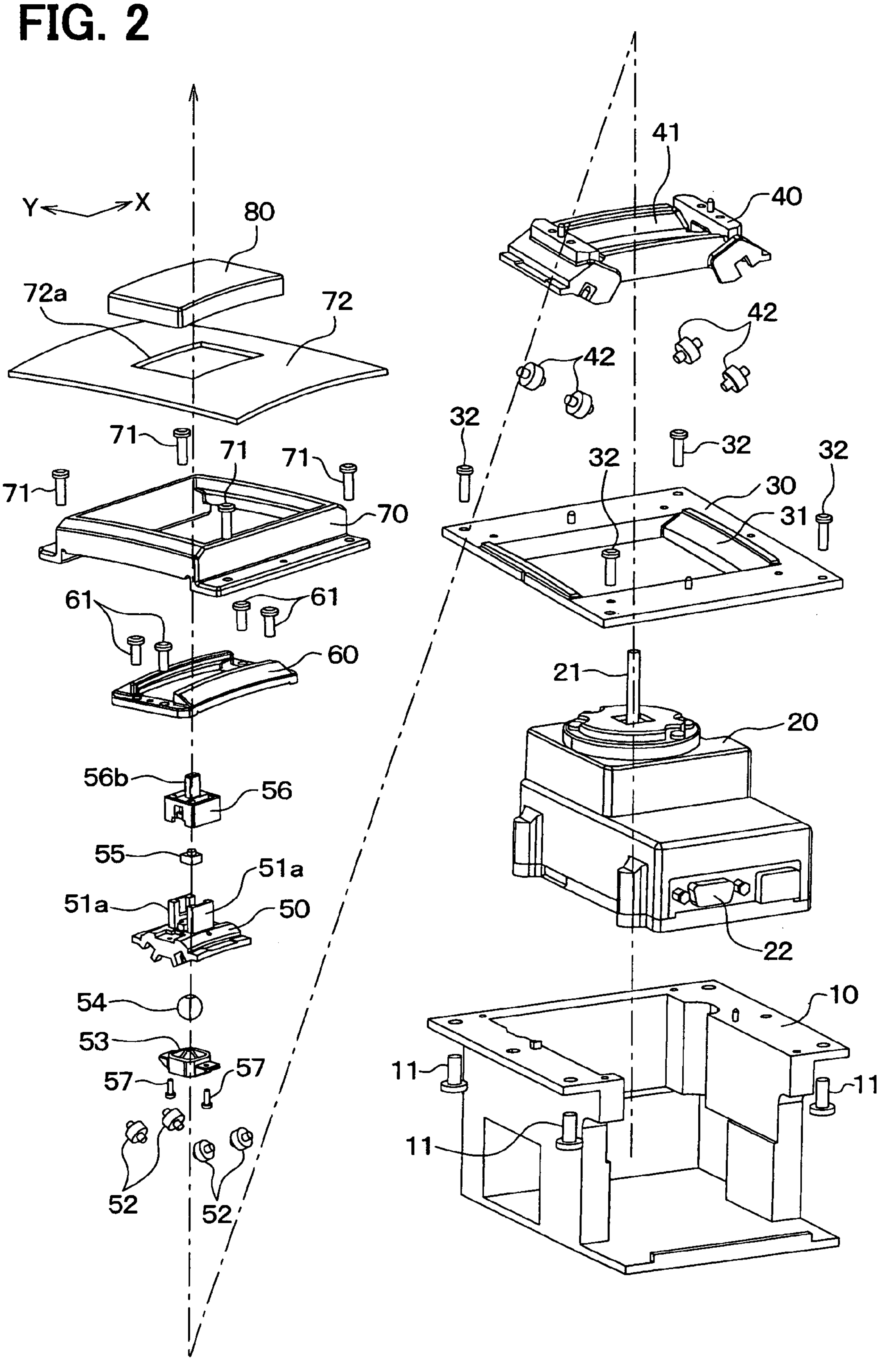
FIG. 2 is a schematic exploded perspective view showing the operating device for the vehicle.

FIG. 2 is a schematic exploded perspective view showing the operating device 1 for the vehicle. A structure of the operating device 1 will be explained with reference to the drawing.

The lower casing 10 accommodates the joystick device 20.

The joystick device 20 outputs a signal, which corresponds to a movement of a forward end of an axial rod 21, from a connector 22.

Figure 3:
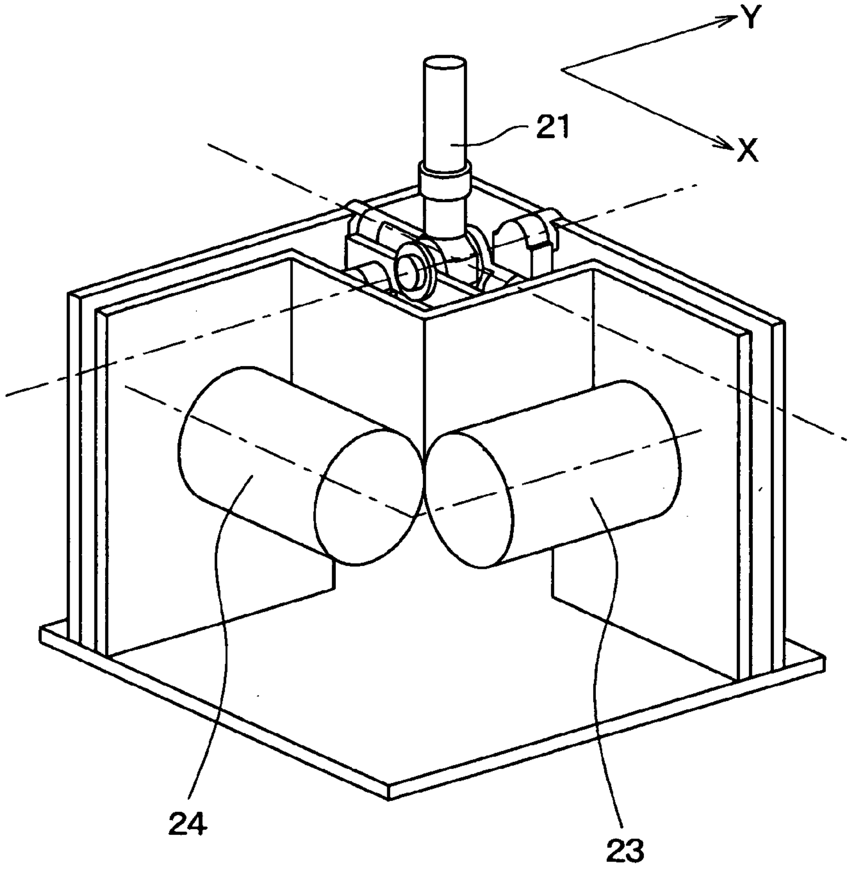
FIG. 3 is a view showing an inside structure of the joystick device.

FIG. 3 shows an inside structure of the joystick device 20. The joystick device 20 has an X-axis encoder 23 for detecting rotational displacement of a supporting axis, wherein axial rod 21 is rotated around the supporting axis and the rotational displacement depends on an operation in a direction of the X-axis of the axial rod 21. The joystick device 20 further has a Y-axis encoder 24 for detecting rotational displacement of a supporting axis, wherein the rotational displacement depends on an operation in a direction of the Y-axis of the axial rod 21. Then, the joystick device 20 outputs a signal depending on respective rotational displacements detected by the X-axis encoder 23 and the Y-axis encoder 24.

In some kinds of the joystick devices, an operating load for the X-axis is made to be different from that for the Y-axis. In the joystick device 20 according to the embodiment, the operating load for the X-axis and the operating load for the Y-axis are made to be equal to each other.

The base member 30 is fixed to the lower casing 10 by means of screws 32, after the joystick device 20 is accommodated in the lower casing 10.

An opening is formed at a center of the base member 30, through which the axial rod 21 of the joystick device 20 passes. A pair of rails 31 (Y-direction rails), which is in parallel with the Y direction, is formed at a periphery of the opening.

Four cylindrical rollers 42 are rotatably assembled to four corners of a lower surface of a Y-direction sliding unit 40. Then, the Y-direction sliding unit 40 is assembled to an upper surface of the base member 30, such that each of the rollers 42 rotates on and moves along the Y-direction rails 31. As above, the Y-direction sliding unit 40 is movable in the Y direction on the upper surface, wherein the pair of the Y-direction rails 31 is arranged in parallel to each other. Since the rollers 42 are assembled to the Y-direction sliding unit 40, friction generated when the Y-direction sliding unit 40 moves in the Y direction is decreased, so that the Y-direction sliding unit 40 can smoothly move.

In a similar manner to the base member 30, an opening is formed at a center of the Y-direction sliding unit 40, through which the axial rod 21 of the joystick device 20 passes. And a pair of rails 41 (X-direction rails), which is in parallel with the X direction, is formed at a periphery of the opening.

In a similar manner to the Y-direction sliding unit 40, four cylindrical rollers 52 are rotatably assembled to four corners of a lower surface of an X-direction sliding unit 50. Then, the X-direction sliding unit 50 is assembled to an upper side of the Y-direction sliding unit 40, such that each of the rollers 52 rotates on and moves along the X-direction rails 41. As above, the X-direction sliding unit 50 is movable in the X direction on the upper side, wherein the pair of the X-direction rails 41 is arranged in parallel to each other. Since the rollers 52 are assembled to the X-direction sliding unit 50, friction generated when the X-direction sliding unit 50 moves in the X direction is decreased, so that the X-direction sliding unit 50 can smoothly move.

According to the embodiment, the X-direction sliding unit 50 is arranged above the Y-direction sliding unit 40 so that a load of the X-direction sliding unit 50 is applied to the Y-direction sliding unit 40. The operating load for the X-direction sliding unit 50 in the horizontal direction of the operation knob 80 is made smaller than the operating load for the Y-direction sliding unit 40 in the cross direction of the operation knob 80.

In general, an operating screen is landscape. Therefore, a moving operation in the X direction is carried out more often than a moving operation in the Y direction. Accordingly, as explained above, when the operating load for the X-direction sliding unit 50 in the horizontal direction of the operation knob 80 is made smaller than the operating load for the Y-direction sliding unit 40 in the cross direction of the operation knob 80, an operating burden for moving the operation knob 80 in the X direction can be reduced.

When the operation knob 80 is moved on the operation surface, a movement in the cross direction (in the Y direction) is generally slower, whereas a movement in the horizontal direction (in the X direction) becomes faster. Due to this fact, the operating load for the operation knob 80 in the horizontal direction is made smaller in order to make inertia in the horizontal direction of the operation knob 80 smaller. On the other hand, the operating load for the operation knob 80 in the cross direction is made larger in order to make inertia in the cross direction of the operation knob 80 larger. As a result, operationality of the operation knob 80 is improved.

Furthermore, materials for the X-direction rails 41 and the Y-direction rails 31 are different from each other, so that coefficient of dynamic friction in case of the X-direction sliding unit 50 moving on the X-direction rails 41 is made smaller than coefficient of dynamic friction in case of the Y-direction sliding unit 40 moving on the Y-direction rails 31. For example, the material for the base member 30 on which the Y-direction rails 31 are formed is ABS resin, whereas the material for the Y-direction sliding unit 40 on which the X-direction rails 41 are formed is POM resin. The POM resin has a lower coefficient of friction than that of the ABS resin, so that the POM resin is more slippery than the ABS resin.

Accordingly, in the case that the ABS resin is selected as the material for the Y-direction rails 31 and the POM resin is selected as the material for the X-direction rails 41, the coefficient of dynamic friction for the X-direction rails 41 is made smaller than that for the Y-direction rails 31, when compared with a case in which the ABS resin is used for both of them.

A ball bearing 54 is formed into a spherical shape made of metal or synthetic resin. A though-hole, through which the axial rod 21 of the joystick device 20 passes, is formed in the ball bearing 54. When the axial rod 21 is inserted into the through-hole, the axial rod 21 is movable in an axial direction with respect to the through-hole.

A lower sliding cover 53 of a patelliform is fixed to a lower surface of the X-direction sliding unit 50 by means of bolts 57, so that the ball bearing 54 is interposed therebetween and rotatbly supported.

Guide portions 51*a* are formed at an upper side, such that the guide portions 51*a* are held by a stem 56 and the stem 56 is guided by the guide portions 51*a* to move in a vertical direction.

The stem 56 moves in the vertical direction along the guide portions 51*a*. The stem 56 has a projection 56*b* which is engaged with a recess (not shown) formed at a lower side of the operation knob 80.

A push switch 55 is arranged at a center of the guide portions 51*a*. The push switch 55 closes its contacts when the push switch 55 receives a pushing force from the operation knob 80 in a vertical and downward direction via the stem 56. On the other hand, the push switch 55 opens its contacts by spring force of a return spring when the pushing force disappears. And the operation knob 80 as well as the stem 56 is brought back to their initial positions. As above, the push switch 55 is turned on or turned of, depending on the pushing force.

The push switch 55 has two terminals, one of which is connected to a battery via a pull-up resistor and the other of which is grounded. When the push switch 55 is turned off, the terminals are opened, so that a voltage equal to battery voltage is outputted from the terminal connected to the battery via the pull-up resistor. When the push switch 55 is turned off, the two terminals are short-circuited, and grounded voltage is outputted from the terminal connected to the pull-up resistor.

An upper sliding cover 60 prevents the X-direction sliding unit 50 from falling away. The upper sliding cover 60 is fixed to the Y-direction sliding unit 40 by means of bolts 61, wherein the X-direction sliding unit 50 is arranged between the bolts 61.

The upper casing 70 prevents the Y-direction sliding unit 40. The upper casing 70 is fixed to the base member by means of bolts 71, wherein the Y-direction sliding unit 40 is arranged between the bolts 71.

The bezel 72 is formed of resin and formed into a plate shape. The bezel 72 is slightly bent in the cross direction (in the X direction) so that the operation surface is formed into a curved surface having a predetermined curvature radius in the X direction. The operation surface is also bent in the Y direction, so that the curved surface also has a predetermined curvature radius in the Y direction. The curvature of radius of the curved surface in the Y direction is larger than that in the X direction.

The above explained curved surface is more desirable than the flat surface, because such curved surface fits better to movements of a hand and/or fingers of the operating person. According to the embodiment, therefore, the operation surface is formed as the curved surface in view of the operationality.

An opening 72*a*, though which the stem 56 passes, is formed at a center of the bezel 72.

Figure 4:
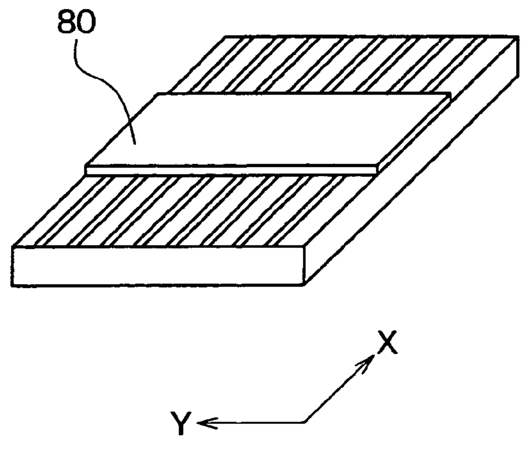
FIG. 4 is a view explaining a concavo-convex portion formed on an operation knob.

The operation knob 80 may be made of resin or metal, and a concavo-convex portion is formed in the horizontal direction (the X direction) and in the cross direction (the Y direction), as shown in FIG. 4. Any slippage is prevented by such concavo-convex portion to improve the operationality. In FIGS. 1, 2, 6 to 10, 13 and 16, illustration for the concavo-convex portion is omitted.

The projection 56*b* of the stem 56 is press-fitted into the recess (not shown) formed at the lower side of the operation knob 80 in order that the operation knob 80 is assembled to the stem 56, after the bezel 72 is fixed to the base member 30. The stem 56 may be connected to the lower side of the operation knob 80 by means of screws.

According to the embodiment, a curvature of an upper surface of the X-direction rails 41 formed on the Y-direction sliding unit 40 is made to be equal to a curvature of the bezel 72 in the X direction, so that the operation knob 80 moves along the curved surface of the bezel 72 when the operation knob 80 is operated in the X direction. In a similar manner, a curvature of an upper surface of the Y-direction rails 31 formed on the base member 30 is made to be equal to a curvature of the bezel 72 in the Y direction, so that the operation knob 80 moves along the curved surface of the bezel 72 when the operation knob 80 is operated in the Y direction.

The opening 72*a* formed in the bezel 72 has such a size that the stem 56 does not interfere with the opening 72*a* even when the operation knob 80 is moved in the X direction or Y direction to respective maximum movable end positions.

Figure 5:
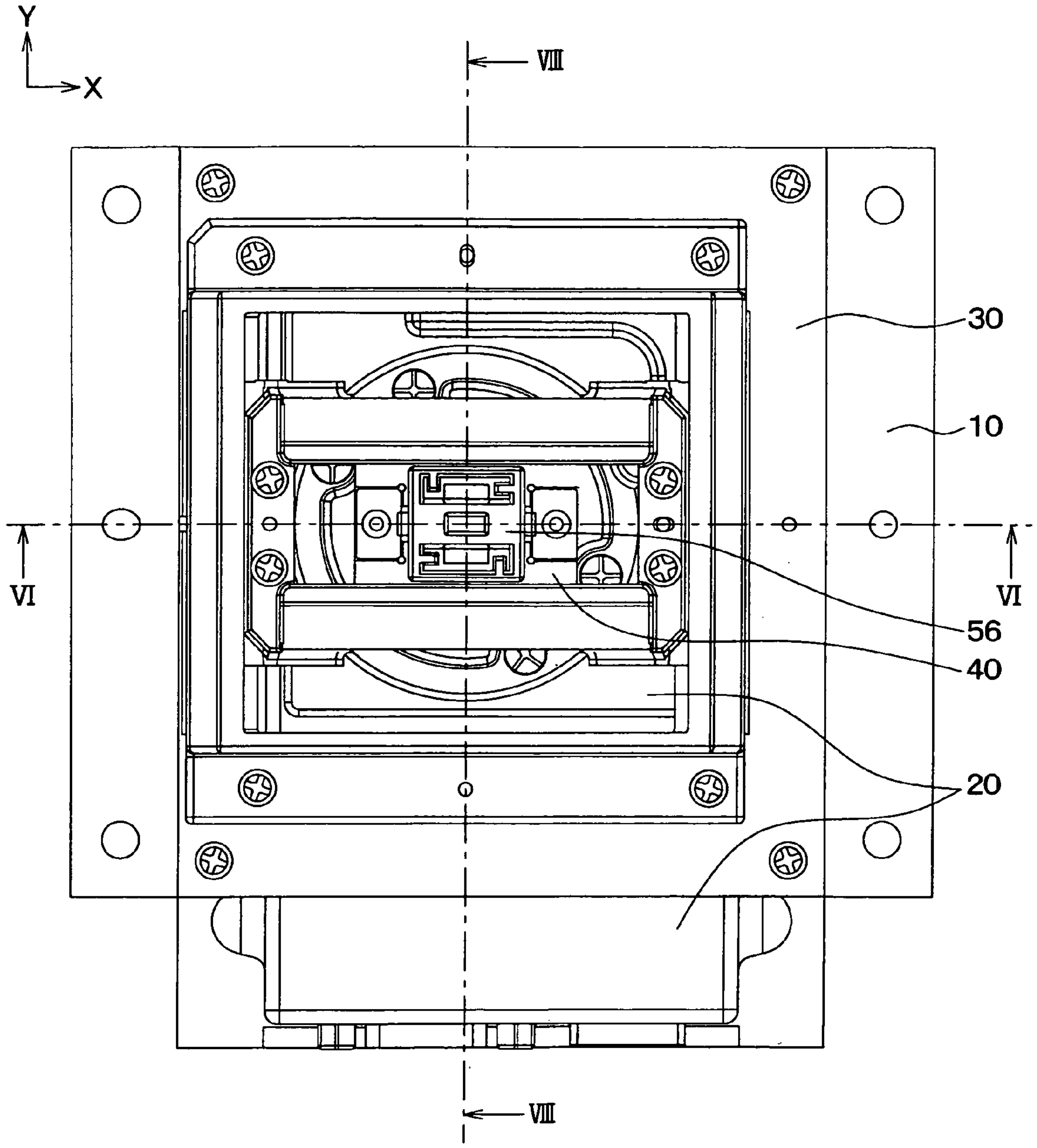
FIG. 5 is a top plan view showing the operating device for the vehicle, from which the operation knob and a bezel are removed.
Figure 6A:
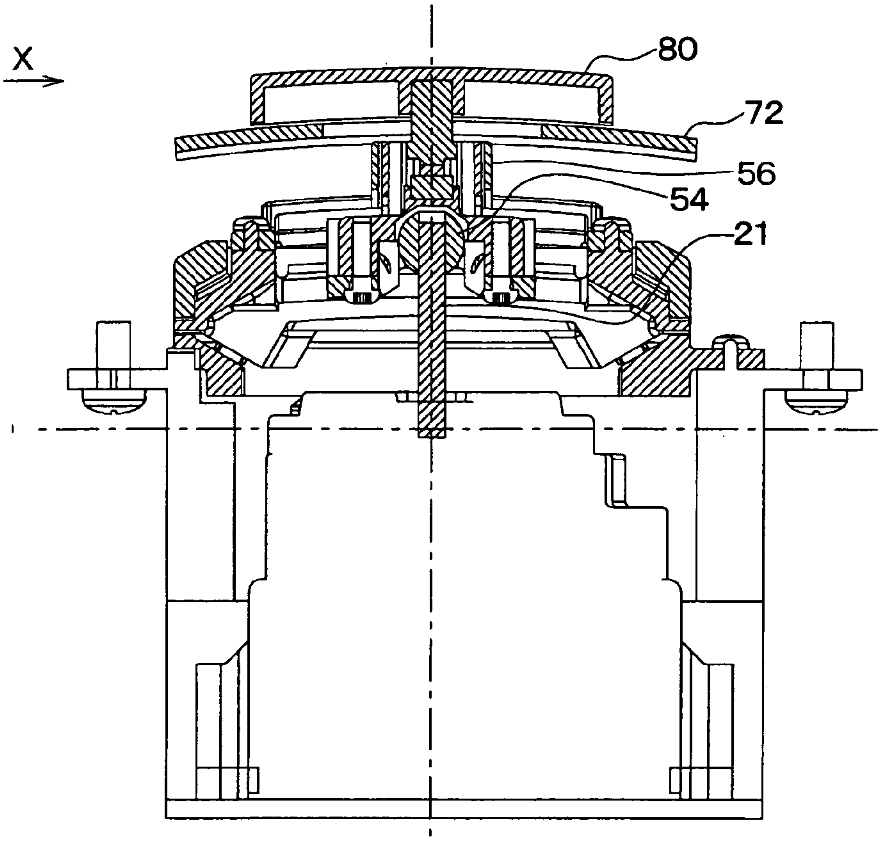
FIG. 6A is a cross sectional view of the operating device, taken along a line VI-VI in FIG. 5, in which the operation knob is positioned at its center.

FIG. 5 is a top plan view showing the operating device 1 for the vehicle, from which the operation knob 80 and the bezel 72 are removed. FIG. 6 is a cross-sectional view taken along a line VI-VI in FIG. 5. FIG. 6A shows the cross sectional view of the operating device 1, in which the operation knob 80 is positioned at its center, and FIG. 6B shows the cross sectional view of the operating device 1, in which the operation knob 80 is moved in the X direction.

As shown in FIG. 6A, in which the operation knob 80 is positioned at its center, each center of the operation knob 80, the stem 56 and the ball bearing 54 is positioned on a reference line, which extends in the vertical direction from the supporting axis of the axial rod 21 of the joystick device 20.

Figure 6B:
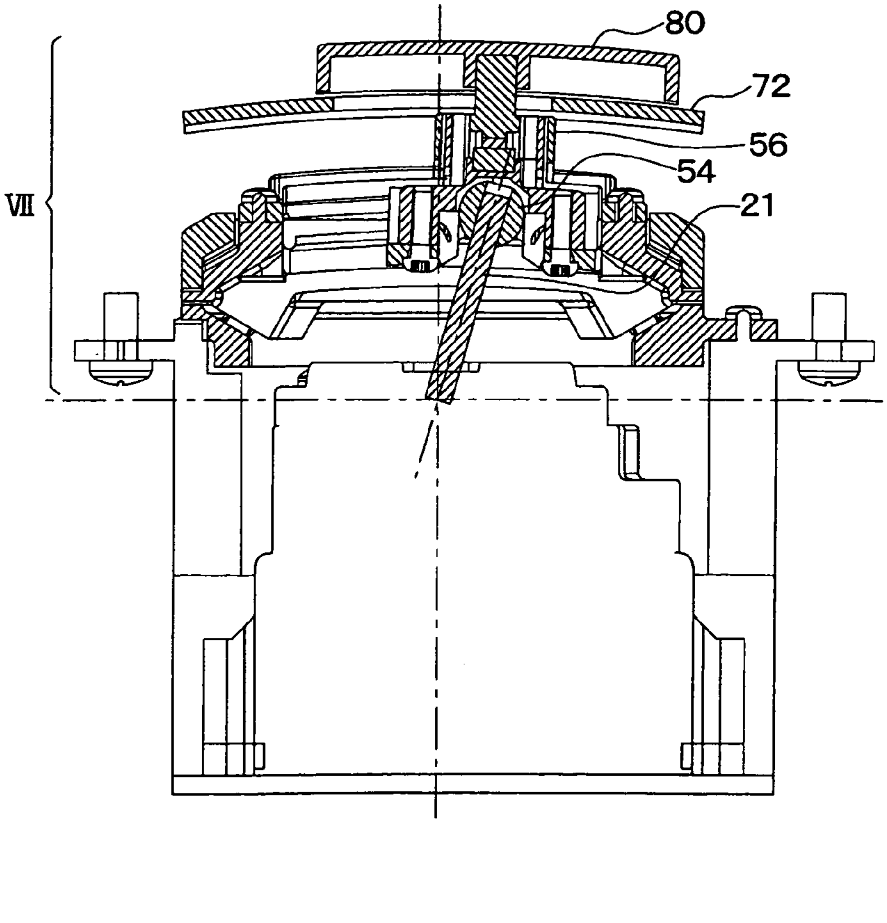
FIG. 6B is a cross sectional view of the operating device, taken along the line VI-VI in FIG. 5, in which the operation knob is moved in X direction.

When the operation knob 80 is moved in the X direction together with the X-direction sliding unit 50, the stem 56 as well as the ball bearing 54 is moved in the X direction together with the operation knob 80, as shown in FIG. 6B. During such movement, the ball bearing 54 rotates on the sliding cover 53 and slides in the axial direction of the axial rod 21 of the joystick device 20. At the same time, the forward end of the axial rod 21 of the joystick device 20 is moved in the X direction together with the ball bearing 54. Then, the signal corresponding to such movement of the forward end of the axial rod 21 is outputted from the connector 22.

A turning-radius of the forward end of the axial rod 21 is defined by a length of the axial rod 21 of the joystick device 20. The forward end of the axial rod 21 moves on a surface having a relatively small curvature. However, as explained above, because of a structure in which the ball bearing 54 moves in the axial direction of the axial rod 21 of the joystick device 20, it becomes possible to move the operation knob 80 on the operation surface having a larger curvature. The forward end of the axial rod 21 of the joystick device 20 can be moved in accordance with the movement of the operation knob 80.

Figure 7:
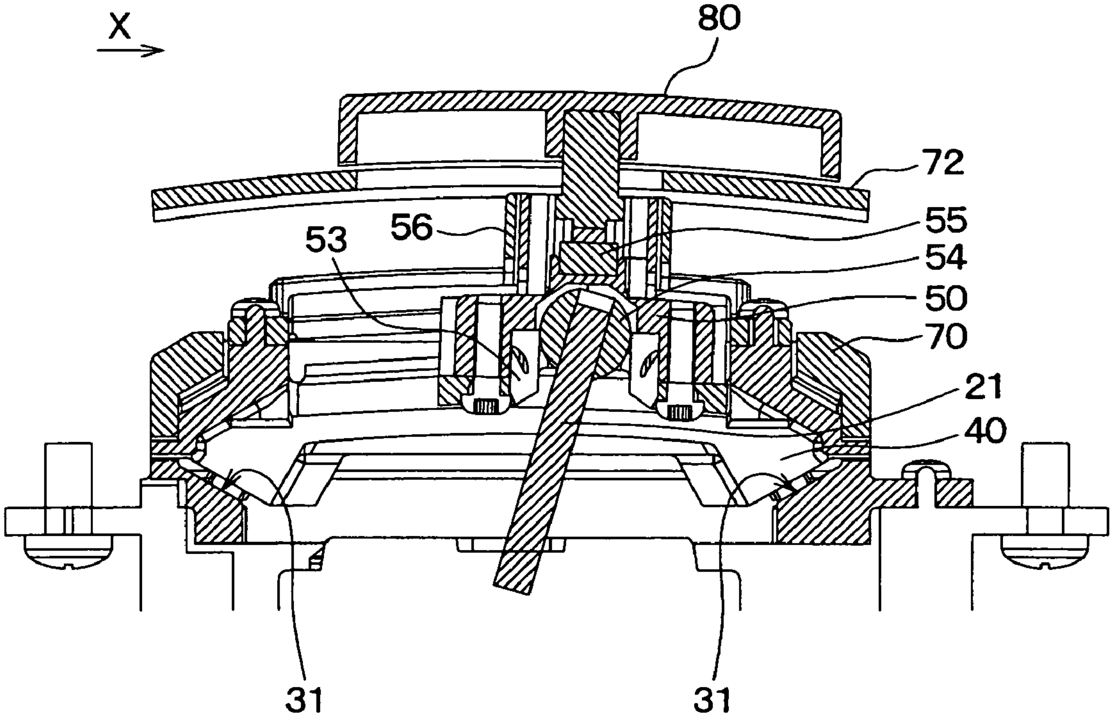
FIG. 7 is an enlarged view showing a portion VII indicated in FIG. 6B.

FIG. 7 is an enlarged view showing a portion VII indicated in FIG. 6B. When the operation knob 80 receives the pushing force in the direction perpendicular to the operation surface, the pushing force is transmitted to the push-switch 55 via the stem 56, so that the push-switch 55 is turned on.

Since the operation knob 80 is so arranged to move downwardly in accordance with a pushing operation in the vertical and downward direction to the operation surface, it is possible even for an inexperienced person to operate the operation knob 80 without causing displacement thereof.

The upper surfaces of the pair of the Y-direction rails 31, which are formed on the surface of the base member 30 in parallel to each other, are respectively inclined toward the inside of the Y-direction rails 31. Accordingly, the Y-direction sliding unit 40 is centered by its own weight and weight of the operation knob 80, because the upper surfaces of the Y-direction rails 31 are inclined. Furthermore, the Y-direction sliding unit 40 moves while it is always in contact with the Y-direction rails 31. As a result, saccadic movement can be reduced when the Y-direction sliding unit 40 moves on the Y-direction rails 31.

Figure 8A:
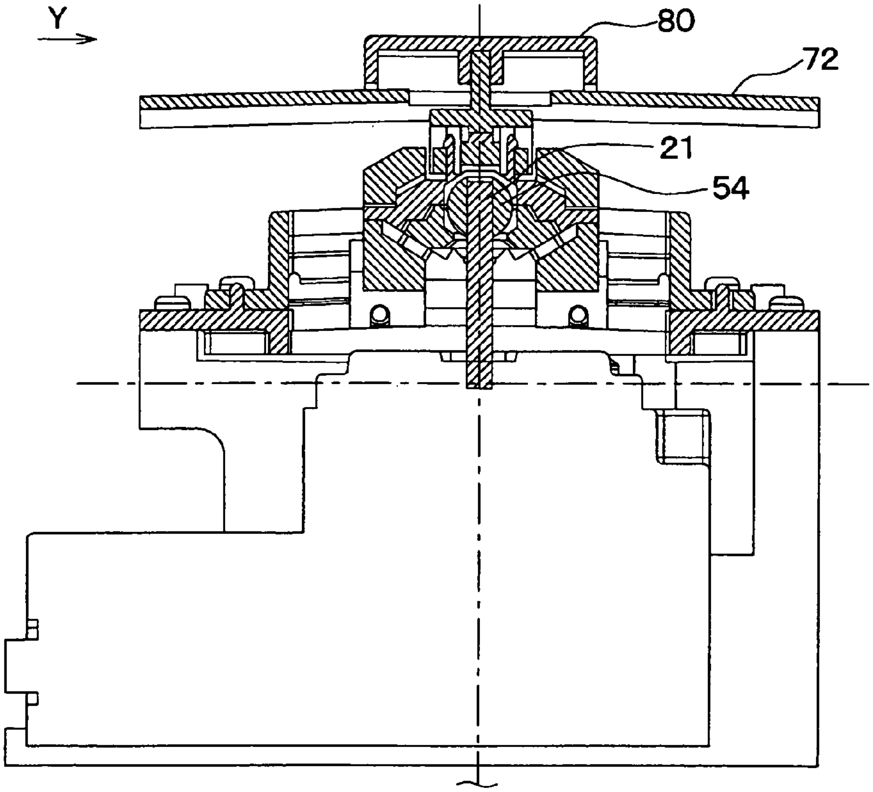
FIG. 8A is a cross sectional view of the operating device, taken along a line VIII-VIII in FIG. 5, in which the operation knob is positioned at its center.
Figure 8B:
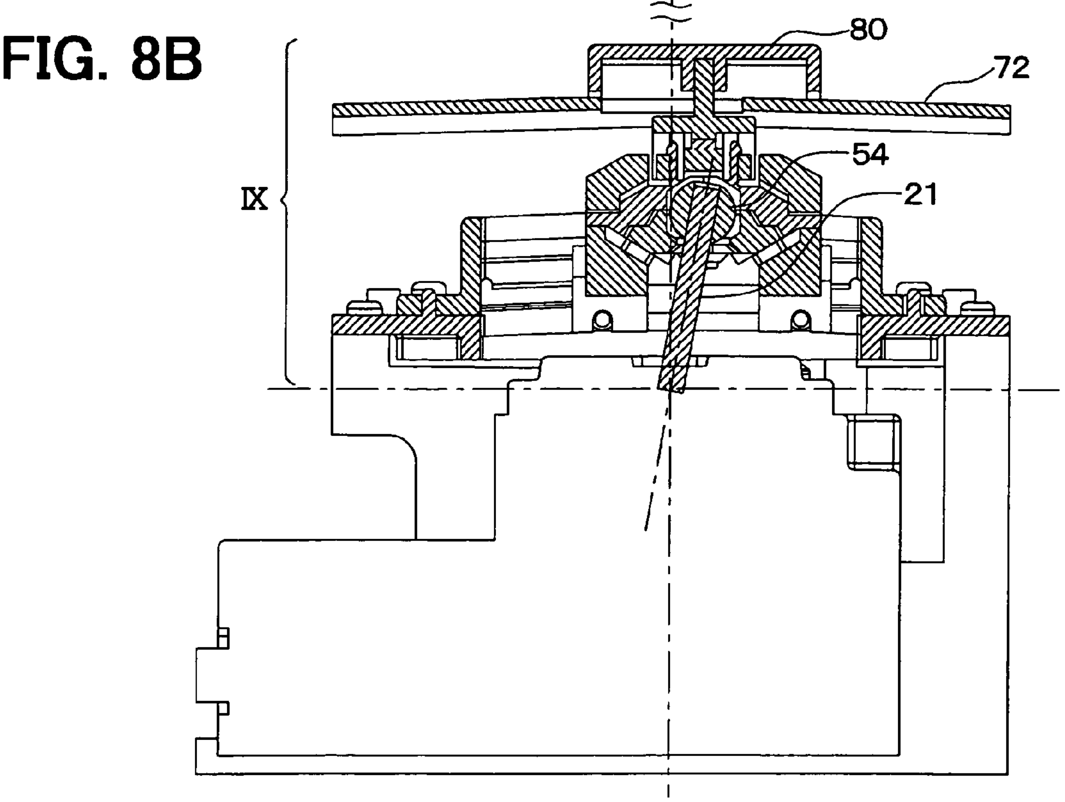
FIG. 8B is a cross sectional view of the operating device, taken along the line VIII-VIII in FIG. 5, in which the operation knob is moved in Y direction.

FIG. 8 is a cross-sectional view taken along a line VIII-VIII in FIG. 5. FIG. 8A shows the cross sectional view of the operating device 1, in which the operation knob 80 is positioned at its center, whereas FIG. 8B shows the cross sectional view of the operating device 1, in which the operation knob 80 is moved in the Y direction.

As shown in FIG. 8A, in which the operation knob 80 is positioned at its center, each center of the operation knob 80, the stem 56 and the ball bearing 54 is positioned on a reference line, which extends in the vertical direction from the supporting axis of the axial rod 21 of the joystick device 20.

When the operation knob 80 is moved in the Y direction, the stem 56 and the ball bearing 54 are moved in the Y direction together with the operation knob 80, as shown in FIG. 8B. During such movement, the ball bearing 54 rotates on the sliding cover 53 and slides in the axial direction of the axial rod 21 of the joystick device 20. At the same time, the forward end of the axial rod 21 of the joystick device 20 is moved in the Y direction together with the ball bearing 54. Then, the signal corresponding to such movement of the forward end of the axial rod 21 is outputted from the connector 22.

Figure 9:
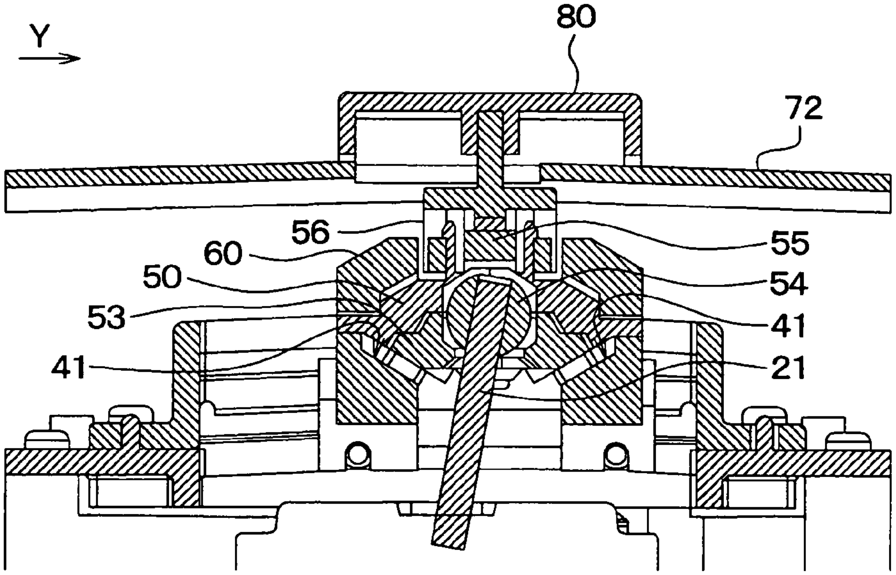
FIG. 9 is an enlarged view showing a portion IX indicated in FIG. 8B.

FIG. 9 is an enlarged view showing a portion IX indicated in FIG. 8B. When the operation knob 80 receives the pushing force in the direction perpendicular to the operation surface, the pushing force is transmitted to the push-switch 55 via the stem 56, so that the push-switch 55 is turned on.

The upper surfaces of the pair of the X-direction rails 41, which are formed on the surface of the Y-direction sliding unit 40 in parallel to each other, are respectively inclined toward the inside of the X-direction rails 41, as in a similar manner to the Y-direction rails 31. As a result that the upper surfaces of the X-direction rails 41 are inclined, saccadic movement can be reduced when the X-direction sliding unit 50 moves on the X-direction rails 41.

According to the embodiment, the opening 72*a* formed on the bezel 72 can not be recognized from the outside, even when the operation knob 80 is moved in the X direction or Y direction to their maximum movable end positions. In other words, the operation knob 80 is designed to have such dimension, according to which the opening 72*a* formed on the bezel 72 can not be recognized from the outside, even in the case that the operation knob 80 is moved in the X direction or Y direction to their maximum movable end positions.

Figure 10A:
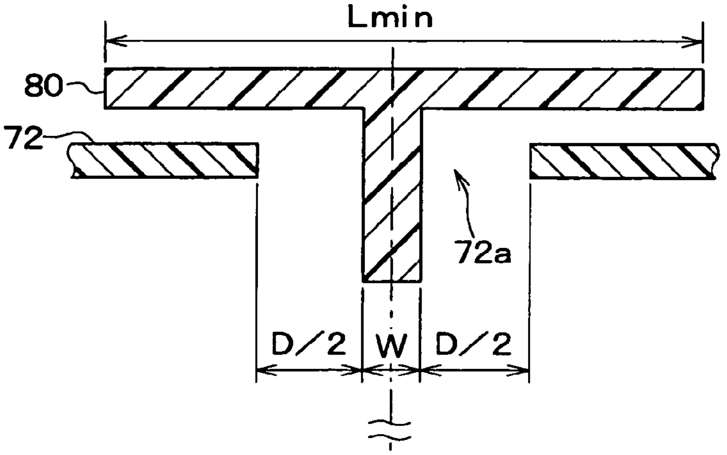
FIG. 10A is a schematic view showing relative positions between the operation knob and the bezel, wherein the operation knob is positioned at a center of the opening.

The dimension of the operation knob 80 will be explained with reference to FIG. 10. FIG. 10A is a view showing relative positions between the operation knob 80 and the bezel 72, wherein the operation knob 80 is positioned at a center of the opening 72*a*, whereas FIG. 10B shows the relative positions in which the operation knob 80 is moved to an end of the opening 72*a*.

Figure 10B:
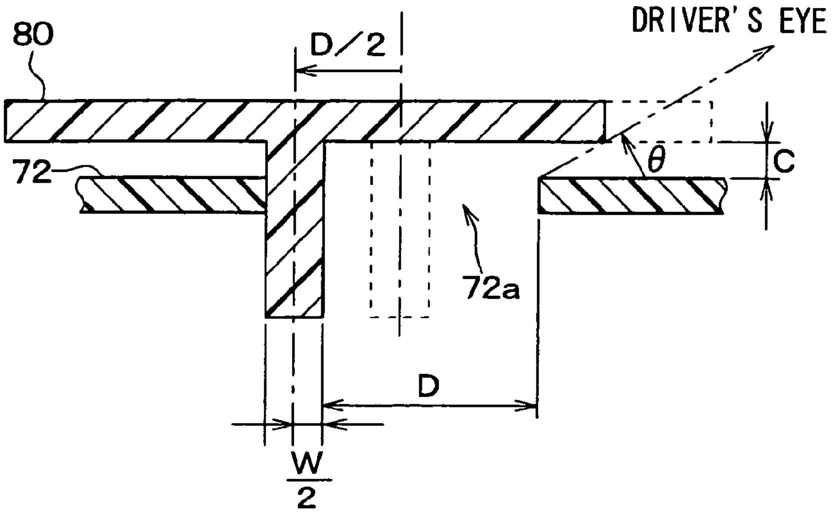
FIG. 10B is a schematic view showing the relative positions between the operation knob and the bezel, in which the operation knob is moved to an end of the opening.

In FIGS. 10A and 10B, "D" designates a moving distance of the operation knob 80, "W" designates a width of a supporting axis (corresponding to the projection 56*b* of the stem 56) for supporting the operation knob 80, and "C" designates a clearance (gap) between the operation knob 80 and the operation surface of the bezel 72. Furthermore, "θ" designates an angle formed between the surface of the bezel 72 and a direction toward an operator's eye, when the opening 72*a* is viewed through the gap between the operation knob 80 and the bezel 72, wherein the operation knob 80 is moved to the end of the opening 72*a*, as shown in FIG. 10B. "Lmin" designates a minimum length of a side of the operation knob 80.

The following formula is formed:

$$L\text{min}/2=D+W/2+C/\tan\theta$$

$$\text{that is, } L\text{min}=2D+W+2C/\tan\theta$$

In case that D=15 mm, W=12 mm, C=1 mm, and θ=30°, the minimum length of the side for the operation knob 80 is calculated as "Lmin≅46 mm". Namely, when the length of the side for the operation knob 80 is designed to be larger than 46 mm, it becomes possible that the opening 72*a* can not be recognized from the outside.

Figure 11:
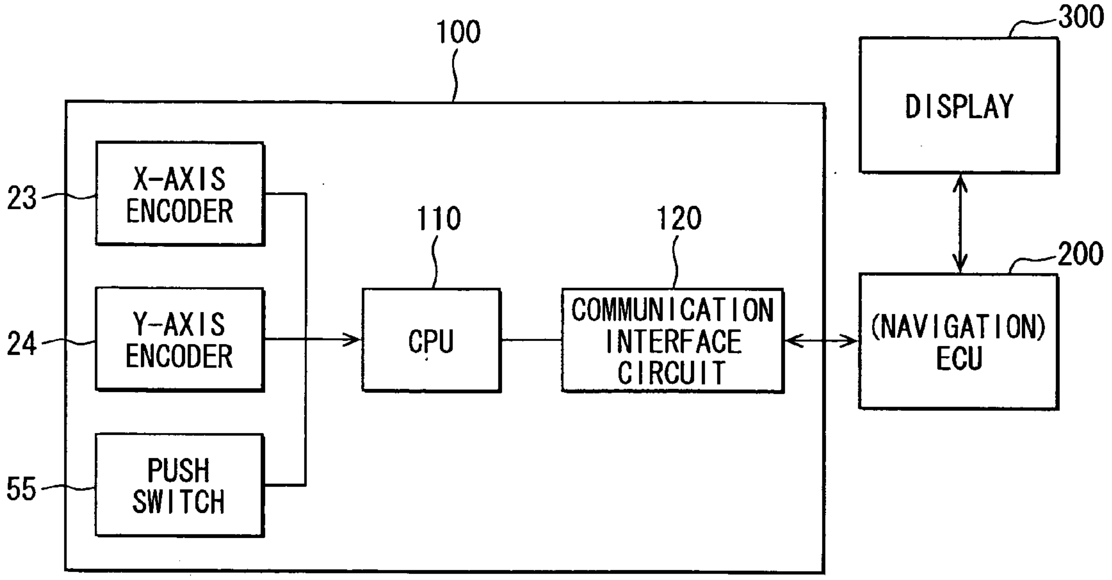
FIG. 11 is a schematic view showing a display system having an operating apparatus with the operating device for the vehicle.

FIG. 11 shows a display system having an operating apparatus 100 with the operating device 1 for the vehicle, a navigation ECU 200 and a display device 300.

The operating apparatus 100 has the X-axis encoder 23 and the Y-axis encoder 24 assembled into the joystick device 20, the push switch 55 which is turned on and off in accordance with the movement of the operation knob 80 in the vertical direction, a CPU 110 for performing calculation, and a communication interface circuit 120. The X-axis encoder 23, the Y-axis encoder 24 and the push switch 55 are assembled into the operating device 1.

The CPU 110 calculates moving distances of the operation knob 80 on the operation surface in the X direction and the Y direction, based on the signals from the X-axis encoder 23 and the Y-axis encoder 24. In addition, the CPU 110 determines whether the push switch 55 is turned on or off. The CPU 110 sends a signal for the moving distances of the operation knob 80 in the X and Y directions as well as a signal for turned-on or turned-off condition of the push switch 55 to the navigation ECU 200 through the communication interface circuit 120.

The navigation ECU 200 displays information on the display device 300, which correspond to the signal for the moving distances of the operation knob 80 in the X and Y directions as well as the signal for turned-on or turned-off condition of the push switch 55.

Figure 12:
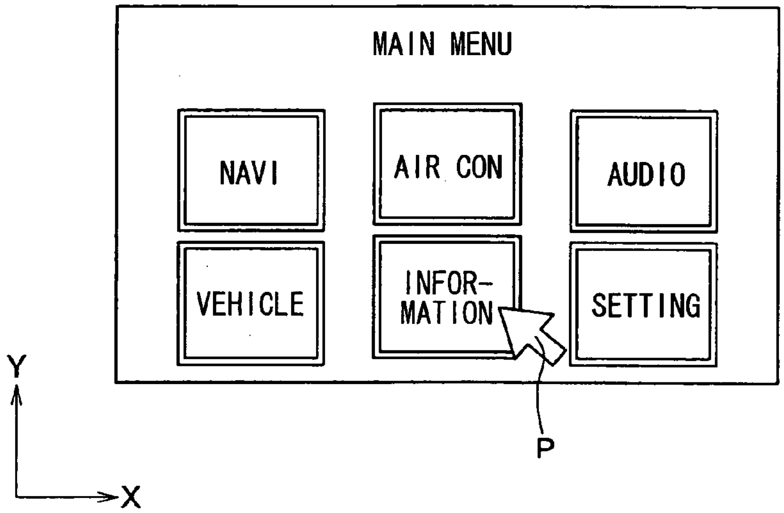
FIG. 12 is a schematic view showing an example of a main menu panel.

FIG. 12 shows an example of a main menu panel. On the menu panel, respective switches for "Navi" (navigation), "Air Con" (air conditioner), "Audio", "Vehicle", "Information", and "Setting" are displayed. In addition, a pointer "P", which moves on the display panel in accordance with the movement of the operation knob 80 of the operating apparatus 100, is displayed.

When the operator moves the operation knob 80 on the operation surface in the horizontal direction (in the X direction), the pointer "P" moves on the display panel in a left-and-right direction. When the operator moves the operation knob 80 on the operation surface in the cross direction (in the Y direction), the pointer moves on the display panel in an up-and-down direction.

As shown in FIG. 12, a length of the display panel of the display device 300 in the horizontal direction is made longer than a length in the vertical direction. In accordance with such configuration of the display panel of the display device 300, a maximum moving amount (maximum movable distance) of the operation knob 80 in the horizontal direction is made longer than a maximum moving amount (maximum movable distance) of the operation knob 80 in the cross direction.

A turn-on signal of the push switch 55 is inputted from the operating apparatus 100 to the navigation ECU 200, when the operator moves the operation knob 80 on the operation surface and pushes down the operation knob 80 in the vertical direction perpendicular to the operation surface of the operating apparatus 100 after the operator locates the pointer "P" at his desired switch on the display panel. The navigation ECU 200 carries out a function related to the switch on the display panel selected by the pointer "P", in accordance with the turn-on signal of the push switch 55. For example, when the turn-on signal of the push switch 55 is inputted while the pointer "P" is located on the switch indicating "Navi", a screen of the display panel is changed to other screens for carrying out various kinds of functions related to the car navigation.

According to the above explained structure, the push switch 55 is moved together with the operation knob 80 along the operation surface. And when the operation knob 80 receives the pushing force in the vertical direction perpendicular to the operation surface, the operation knob 80 is moved in the vertical direction so that the operation knob 80 transmits the pushing force to the push switch 55. Accordingly, it is possible to hold by one hand the operation knob 80 in a movable manner on the operation surface and to apply the pushing force to the operation knob 80 in the vertical direction, so that the signal corresponding to the pushing force is outputted from the push switch 55. The operationality is thereby improved.

The invention shall not be limited to the above embodiment, but can be modified in various ways based on the points of the invention.

For example, although the bezel 72 is provided in the above embodiment, the bezel 72 is not always necessary.

Figure 13:
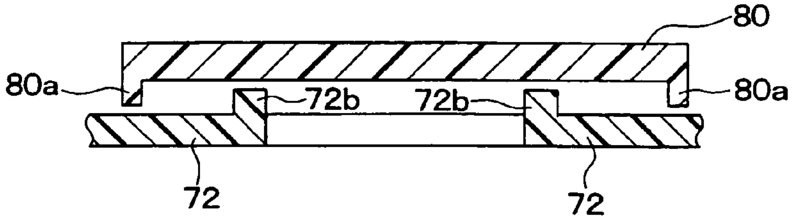
FIG. 13 is a schematic cross-sectional view showing portions of the bezel and the operation knob, in which flanged portions are formed.

As shown in FIGS. 10A and 10B, there is formed the gap between the operation knob 80 and the bezel 72, wherein the gap is formed as a relatively large gap. As a result, it may happen that dust or foreign matter gets into the opening 72*a* formed in the bezel 72 through the gap. Accordingly, as shown in FIG. 13, a flanged portion 72*b* may be formed at the periphery of the opening 72*a* formed in the bezel 72, wherein the flanged portion 72*b* project toward the upper side of the bezel 72. Alternatively, a flanged portion 80*a* may be formed at a periphery of the operation knob 80 on the side to the bezel 72, in order to prevent the dust or the foreign matter from getting into the opening 72*a*.

Figure 14:
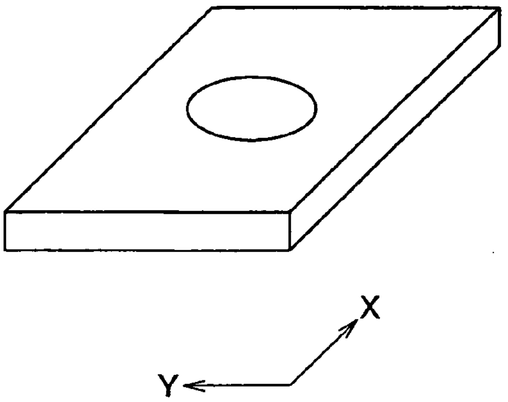
FIG. 14 is a schematic perspective view showing the operation knob, in which a circular concave portion is formed on an upper side thereof.

As shown in FIG. 4, according to the above embodiment, the concavo-convex portion is formed in the horizontal direction (the X direction) and in the cross direction (the Y direction) on the upper side surface of the operation knob 80. A circular concave may be formed at a center of the upper surface of the operation knob 80, as shown in FIG. 14. Alternatively, a circular convex may be formed at the center of the upper surface of the operation knob 80.

Figure 15:
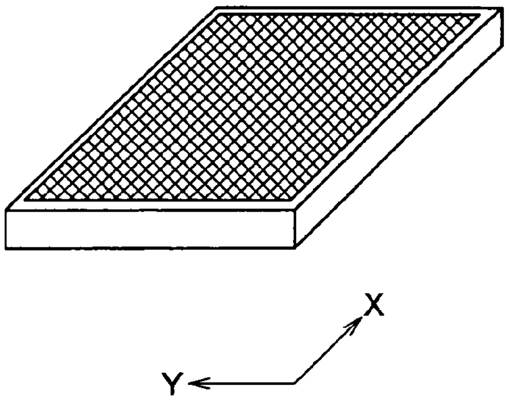
FIG. 15 is a schematic perspective view showing the operation knob, in which a meshed concavo-convex portion is formed on the upper surface of the operation knob.

Furthermore, a meshed concavo-convex portion may be formed on the upper surface of the operation knob 80, as shown in FIG. 15.

Figure 16A:
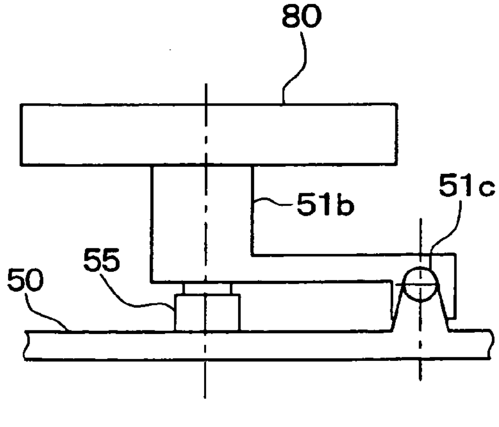
FIGS. 16A and 16B are schematic views showing a hinge provided on X-direction sliding unit.
Figure 16B:
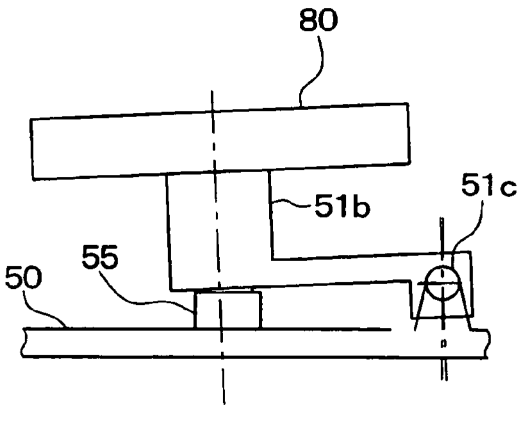

As shown in FIG. 2, according to the above embodiment, the operation knob 80 as well as the stem 56 is arranged so that they move in the vertical direction along the guide portion 51*a* formed on the upper side of the X-direction sliding unit 50. However, as shown in FIGS. 16A and 16B, a pivot axis 51*c* may be provided on the upper side of the X-direction sliding unit 50 and a hinge 51*b* may be provided at the pivot axis 51*c* so that the hinge 51*b* may move up and down around the pivot axis 51*c*. The operation knob 80 may be so arranged that the operation knob 80 may move in the vertical direction by means of the hinge 51*c*.

According to the above embodiment, the push switch 55 is arranged on the X-direction sliding unit 50, and the stem 56 is interposed between the operation knob 80 and the push switch 55. However, the push switch 55 may be provided in the operation knob 80 and the operation knob 80 may be fixed to the X-direction sliding unit 50 by any suitable supporting members (not shown).

Furthermore, according to the above embodiment, the push switch 55 is arranged to be turned-on or turned-off depending on the pushing force applied to the operation knob 80. Namely, the push switch 55 is provided as a signal outputting means, which generates a signal depending on the pushing force received from the operation knob 80. A pressure sensor, a displacement sensor or any other sensors may be used as the signal outputting means, in place of the push switch 55.

Furthermore, according to the above embodiment, the bezel 72 is formed as the curved surface having the predetermined curvatures not only in the horizontal direction but also on the cross direction. The bezel 72 may be formed as a curved surface having a predetermined curvature only in the horizontal direction, or the bezel 72 may be formed as a curved surface having a predetermined curvature only in the cross direction. Furthermore, the bezel 72 may be formed as a flat plate.

Furthermore, according to the above embodiment, the operation knob 80 is moved on the operation surface to any desired position by the Y-direction sliding unit 40 and the X-direction sliding unit 50. The operation knob 80 may have either one of the Y-direction sliding unit 40 and the X-direction sliding unit 50.

As mentioned above, the operation knob 80 is moved on the operation surface to any desired position by the Y-direction sliding unit 40 and the X-direction sliding unit 50, according to the embodiment. The Y-direction sliding unit 40 may be arranged so that it is inclined at 45° in the horizontal direction, whereas the X-direction sliding unit 50 may be inclined at 45° in the cross direction. Then, the Y-direction sliding unit 40 may be provided on the X-direction sliding unit 50, or vice versa, so that the operation knob 80 may be moved on the operation surface to any desired position.

Furthermore, according to the above embodiment, the operating load for the X-direction sliding unit 50 in the horizontal direction of the operation knob 80 is made smaller than the operating load for the Y-direction sliding unit 40 in the cross direction of the operation knob 80. Contrary to that, the operating load for the Y-direction sliding unit 40 in the cross direction of the operation knob 80 may be made smaller than the operating load for the X-direction sliding unit 50 in the horizontal direction of the operation knob 80. Alternatively, the operating loads for the operation knob 80 may be made substantially equal to each other in the horizontal direction and in the cross direction.

Furthermore, according to the above embodiment, the maximum movable distance of the operation knob 80 in the horizontal direction is made longer than the maximum movable distance of the operation knob 80 in the cross direction, in accordance with the configuration of the display panel of the display device 300. However, the maximum movable distances of the operation knob 80 in the horizontal direction and in the cross direction may be made to be almost equal to each other. Contrary to that, the maximum movable distance of the operation knob 80 in the horizontal direction may be made shorter than the maximum movable distance in the cross direction.

Furthermore, according to the joystick device 20 of the above embodiment, the operating load for the X-axis and the operating load for the Y-axis are made to be equal to each other.

However, in the case of the joystick device 20, in which the operating load for the X-axis and the operating load for the Y-axis are different from each other, the operating loads for the operation knob 80 may be made to be different from each other in the horizontal direction and in the cross direction. In addition, the joystick device 20 may be provided in the lower casing 10 in such a manner that the operating loads for the operation knob 80 and the operating loads for the joystick 20 are counterbalanced with each other in the X-axis and Y-axis. Contrary to that, the joystick device 20 may be provided in the lower casing 10 in such a manner that the operating load for the operation knob 80 and the operating load for the joystick 20 in a certain direction may be reinforced.

According to the above embodiment, the upper surfaces of the Y-direction rails 31 and the upper surfaces of the X-direction rails 41, which are respectively formed in parallel to each other, are inclined toward the inside of the respective rails 31 and 41. However, the upper surfaces may not be always inclined.

According to the above embodiment, as shown in FIG. 2, the X-direction sliding unit 50 is arranged above the Y-direction sliding unit 40. Contrary to that, the Y-direction sliding unit 40 may be arranged above the X-direction sliding unit 50.

According to the above embodiment, the whole area of the operation surface for the bezel 72 is formed as the curved surface having the predetermined curvatures not only in the horizontal direction but also in the cross direction. However, a portion of the operation surface for the bezel, for example, a left-hand portion, a right-hand portion, a front-side portion, a back-side portion, a center portion, may be formed as a curved surface.

What is claimed is:

1. An operating device for a vehicle comprising:

an operating portion;

a signal outputting portion for outputting a signal in accordance with pushing force from the operating portion; and a supporting portion for movably supporting the operation portion and the signal outputting portion, such that the operation portion and the signal outputting portion move along an operation surface, wherein the operating portion moves in a direction perpendicular to the operation surface and transmits the pushing force to the signal outputting portion, when the operating portion receives the pushing force in the direction perpendicular to the operation surface, wherein the supporting portion includes an X-direction sliding unit for movably supporting the operating portion in a horizontal direction of the operation surface, and a Y-direction sliding unit arranged above or below the X-direction sliding unit for movably supporting the operating portion in a cross direction of the operation surface, so that the supporting portion movably supports the operating portion by means of the X-direction sliding unit and the Y-direction sliding unit so as to move the operating portion to a desired position on the operation surface, and wherein an operating load for the operating portion by the X-direction sliding unit is made smaller than an operating load for the operating portion by the Y-direction sliding unit.

2. The operating device according to the claim 1, further comprising:

a bezel having an upper surface working as the operation surface, wherein supporting portion movably supports the operating portion and the signal outputting portion in such a manner that the operation portion and the signal outputting portion move on and along the operation surface.

3. The operating device according to the claim 2, wherein the upper surface of the bezel is formed as a curved surface having a predetermined curvature in the horizontal direction of the operation surface.

4. The operating device according to the claim 2, wherein the upper surface of the bezel is formed as a curved surface having a predetermined curvature in the cross direction of the operation surface.

5. The operating device according to the claim 2, wherein the upper surface of the bezel is formed as a curved surface having a first curvature in the horizontal direction of the operation surface and a second curvature in the cross direction of the operation surface, wherein the second curvature is different from the first curvature.

6. The operating device according to the claim 1, wherein the supporting portion movably supports the operating portion so as to move the operating portion to a desired position on the operation surface.

7. The operating device according to the claim 1, wherein the X-direction sliding unit is arranged above the Y-direction sliding unit, so that the operating load for the X-direction sliding unit is applied to the Y-direction sliding unit.

8. The operating device according to the claim 1, further comprising:

X-direction rails for guiding the X-direction sliding unit in X direction, so that the X-direction sliding unit moves along the X-direction rails; and Y-direction rails for guiding the Y-direction sliding unit in Y direction, so that the Y-direction sliding unit moves along the Y-direction rails, wherein materials for the X-direction rails and the Y-direction rails are selected to be different from each other, in order that coefficient of dynamic friction in case of the X-direction sliding unit moving on the X-direction rails becomes smaller than coefficient of dynamic friction in case of the Y-direction sliding unit moving on the Y-direction rails.

9. The operating device according to the claim 1, wherein a maximum movable distance of the operating portion in the horizontal direction, which is performed by the X-direction sliding unit, is made longer than a maximum movable distance of the operating portion in the cross direction, which is performed by the Y-direction sliding unit.

10. The operating device according to the claim 1, wherein the X-direction sliding unit moves on and along upper surfaces of a pair of X-direction rails, which are arranged in parallel to each other, and the upper surfaces of the X-direction rails are respectively inclined toward the inside of the X-direction rails.

11. The operating device according to the claim 1, wherein the Y-direction sliding unit moves on and along upper surfaces of a pair of X-direction rails, which are arranged in parallel to each other, and the upper surfaces of the Y-direction rails are respectively inclined toward the inside of the X-direction rails.

12. The operating device according to the claim 1, wherein a concavo-convex portion is formed on an upper surface of the operating portion in the horizontal direction of the operating portion.

13. The operating device according to the claim 1, wherein a concavo-convex portion is formed on an upper surface of the operating portion in the cross direction of the operating portion.

14. The operating device according to the claim 1, wherein a concave or a convex portion is formed on an upper surface of the operating portion at a center thereof.

15. The operating device according to the claim 1, wherein a meshed concavo-convex portion is formed on an upper surface of the operating portion.

16. The operating device according to the claim 15, wherein a flanged portion is formed at a periphery of the operating portion on a side to the bezel.

17. The operating device according to the claim 1, further comprising:

a joystick device, having an axial rod, for outputting a signal corresponding to a movement of a forward end of the axial rod;

a ball bearing having a through-hole through which the axial rod passes, the ball bearing being movably supported by the axial rod in an axial direction thereof, wherein the supporting portion movably supports the ball bearing as well as the operation portion and the signal outputting portion, such that the ball bearing as well as the operation portion and the signal outputting portion moves along the operation surface, and wherein the ball bearing moves in the axial direction of the axial rod in accordance with a movement of the operating portion on the operation surface, so that a forward end of the axial rod is moved in the axial direction thereof.

18. An operating device for a vehicle comprising:

an operating portion;

a signal outputting portion for outputting a signal in accordance with pushing force from the operating portion; and a supporting portion for movably supporting the operation portion and the signal outputting portion, such that the operation portion and the signal outputting portion move along an operation surface, wherein the operating portion moves in a direction perpendicular to the operation surface and transmits the pushing force to the signal outputting portion, when the operating portion receives the pushing force in the direction perpendicular to the operation surface, wherein the supporting portion includes an X-direction sliding unit for movably supporting the operating portion in a horizontal direction of the operation surface, and a Y-direction sliding unit arranged above or below the X-direction sliding unit for movably supporting the operating portion in a cross direction of the operation surface, so that the supporting portion movably supports the operating portion by means of the X-direction sliding unit and the Y-direction sliding unit so as to move the operating portion to a desired position on the operation surface, and the X-direction sliding unit moves on and along upper surfaces of a pair of X-direction rails, which are arranged in parallel to each other, and the upper surfaces of the X-direction rails are respectively inclined toward the inside of the X-direction rails.

19. An operating device for a vehicle comprising:

an operating portion;

a signal outputting portion for outputting a signal in accordance with pushing force from the operating portion; and a supporting portion for movably supporting the operation portion and the signal outputting portion, such that the operation portion and the signal outputting portion move along an operation surface, wherein the operating portion moves in a direction perpendicular to the operation surface and transmits the pushing force to the signal outputting portion, when the operating portion receives the pushing force in the direction perpendicular to the operation surface, wherein the supporting portion includes an X-direction sliding unit for movably supporting the operating portion in a horizontal direction of the operation surface, and a Y-direction sliding unit arranged above or below the X-direction sliding unit for movably supporting the operating portion in a cross direction of the operation surface, so that the supporting portion movably supports the operating portion by means of the X-direction sliding unit and the Y-direction sliding unit so as to move the operating portion to a desired position on the operation surface, and the Y-direction sliding unit moves on and along upper surfaces of a pair of Y-direction rails, which are arranged in parallel to each other, and the upper surfaces of the Y-direction rails are respectively inclined toward the inside of the Y-direction rails.

20. An operating device for a vehicle comprising:

an operating portion;

a signal outputting portion for outputting a signal in accordance with pushing force from the operating portion; and a supporting portion for movably supporting the operation portion and the signal outputting portion, such that the operation portion and the signal outputting portion move along an operation surface, wherein the operating portion moves in a direction perpendicular to the operation surface and transmits the pushing force to the signal outputting portion, when the operating portion receives the pushing force in the direction perpendicular to the operation surface, wherein the operating device further comprises a bezel having an upper surface working as the operation surface, wherein the supporting portion movably supports the operating portion and the signal outputting portion in such a manner that the operation portion and the signal outputting portion move on and along the operation surface, wherein an opening is formed in the bezel so that the operating portion moves along the operation surface, and wherein the operating portion is designed to have such dimension, according to which the opening formed in the bezel is not recognized from an outside, even when the operating portion is moved to its maximum movable end position.

21. The operating device according to the claim 20, wherein the supporting portion comprises;

an X-direction sliding unit for movably supporting the operating portion in the horizontally direction on the operation surface; and a Y-direction sliding unit arranged above or below the X-direction sliding unit for movably supporting the operating portion in the cross direction on the operation surface, wherein the X-direction sliding unit and the Y-direction sliding unit move the operating portion to a desired position on the operation surface.

22. The operating device according to the claim 21, further comprising:

a stem disposed between the operating portion and the signal outputting portion for transmitting the pushing force from the operating portion to the signal outputting portion; and a guide portion provided on an upper side of either one of the X-direction sliding unit and the Y-direction sliding unit, whichever is arranged above the other, for guiding the stem in the direction perpendicular to the operation surface.

23. The operating device according to the claim 22, wherein an operating load for the X-direction sliding unit in the horizontal direction of the operating portion is made smaller than an operating load for the Y-direction sliding unit in the cross direction of the operating portion.

24. The operating device according to the claim 21, further comprising:

a hinge provided on an upper side of either one of the X-direction sliding unit and the Y-direction sliding unit, whichever is arranged above the other, the hinge being connected at a pivot axis so that the hinge is pivoted around the pivot axis, wherein the hinge guides the operating portion in the direction perpendicular to the operation surface, when the hinge is pivoted around the pivot axis.

25. The operating device according to the claim 20, wherein an opening is formed in the bezel so that the operating portion moves along the operation surface, and the operating portion is designed to have such dimension, according to which the opening formed in the bezel is not recognized from an outside, even when the operating portion is moved to its maximum movable end position.

26. The operating device according to the claim 25, wherein a flanged portion is formed at a periphery of the opening formed in the bezel, wherein the flanged portion projects in a direction toward an upper side of the bezel.

27. An operating device for a vehicle comprising:

an operating portion;

a signal outputting portion for outputting a signal in accordance with pushing force from the operating portion; and a supporting portion for movably supporting the operation portion and the signal outputting portion, such that the operation portion and the signal outputting portion move along an operation surface, wherein the operating portion moves in a direction perpendicular to the operation surface and transmits the pushing force to the signal outputting portion, when the operating portion receives the pushing force in the direction perpendicular to the operation surface, wherein the operating device further comprises;

a joystick device, having an axial rod, for outputting a signal corresponding to a movement of a forward end of the axial rod; and a ball bearing having a through-hole through which the axial rod passes, the ball bearing being movably supported by the axial rod in an axial direction thereof, wherein the supporting portion movably supports the ball bearing as well as the operation portion and the signal outputting portion, such that the ball bearing as well as the operation portion and the signal outputting portion moves along the operation surface, and wherein the ball bearing moves in the axial direction of the axial rod in accordance with a movement of the operating portion on the operation surface, so that a forward end of the axial rod is moved in the axial direction thereof.

28. The operating device according to the claim 27, wherein an operating load of the joystick device for X-axis is different from an operating load of the joystick device for Y-axis, an operating load of the operating portion in the horizontal direction, which is defined by the X-direction sliding unit, is designed to be different from an operating load of the operating portion in the cross direction, which is defined by the Y-direction sliding unit, and the joystick device, the X-direction sliding unit, and the Y-direction sliding unit are assembled together in such a manner that the operating load of the joystick device and the operating load of the operating portion are counterbalanced with each other in the X-axis and Y-axis.

29. The operating device according to the claim 27, wherein an operating load of the joystick device for X-axis is different from an operating load of the joystick device for Y-axis, an operating load of the operating portion in the horizontal direction, which is defined by the X-direction sliding unit, is designed to be different from an operating load of the operating portion in the cross direction, which is defined by the Y-direction sliding unit, and the joystick device, the X-direction sliding unit, and the Y-direction sliding unit are assembled together in such a manner that the operating load of the joystick device and the operating load of the operating portion are reinforced with each other in the X-axis and Y-axis.

* * * * *